United States Patent
Günzel et al.

(10) Patent No.: US 12,488,684 B2
(45) Date of Patent: Dec. 2, 2025

(54) METHOD FOR PROVIDING AN ALREADY GENERATED TRAJECTORY OF A FIRST MOTOR VEHICLE FOR A SECOND MOTOR VEHICLE FOR FUTURE TRAVEL ALONG THE TRAJECTORY, COMPUTER PROGRAM PRODUCT AND ASSISTANCE SYSTEM

(71) Applicant: Volkswagen Aktiengesellschaft, Wolfsburg (DE)

(72) Inventors: Thorben Günzel, Peine (DE); Gregor Marek, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 82 days.

(21) Appl. No.: 18/292,838

(22) PCT Filed: Jul. 12, 2022

(86) PCT No.: PCT/EP2022/069390
§ 371 (c)(1),
(2) Date: Jan. 26, 2024

(87) PCT Pub. No.: WO2023/011867
PCT Pub. Date: Feb. 9, 2023

(65) Prior Publication Data
US 2024/0339031 A1     Oct. 10, 2024

(30) Foreign Application Priority Data
Aug. 3, 2021 (DE) .................. 10 2021 208 407.9

(51) Int. Cl.
*G08G 1/09* (2006.01)
*G01C 21/28* (2006.01)
*G01C 21/34* (2006.01)

(52) U.S. Cl.
CPC ............. *G08G 1/093* (2013.01); *G01C 21/28* (2013.01); *G01C 21/3407* (2013.01)

(58) Field of Classification Search
CPC ........ G08G 1/093; G08G 1/146; G08G 1/143; G01C 21/28; G01C 21/3407;
(Continued)

(56) References Cited

U.S. PATENT DOCUMENTS 10,106,153 B1 * 10/2018 Xiao ...................... B62D 15/02
11,492,012 B2 * 11/2022 Lally ................... B62D 15/0285
(Continued)

FOREIGN PATENT DOCUMENTS

DE     102012223057 A1     6/2014
DE     102016211182 A1     3/2017
(Continued)

OTHER PUBLICATIONS

PCT/EP2022/069390. International Search Report (Nov. 2, 2022).
Priority Appln. No. DE102021208407.9. Office Action (Mar. 23, 2022).

*Primary Examiner* — Jonathan Malikasim
(74) *Attorney, Agent, or Firm* — Peter Zura; LOZA & LOZA, LLP

(57) ABSTRACT

Technologies and techniques for providing an already generated trajectory of a first motor vehicle for at least one second motor vehicle, for future travel along the trajectory via an assistance system. The trajectory is generated by the first motor vehicle and is transmitted to an electronic computing device of the assistance system that is outside the motor vehicle, and in which at least one first parameter characterizing the first motor vehicle is also transmitted to the electronic computing device. The already generated trajectory is evaluated, taking the first characterizing parameter into account, and it is determined whether the trajectory is suitable for the second motor vehicle, and if the already (Continued)

generated trajectory is unsuitable for the second motor vehicle, the trajectory being adapted for the second motor vehicle, taking a second parameter characterizing the second vehicle into account.

20 Claims, 1 Drawing Sheet

(58) Field of Classification Search
CPC ....... B60W 2530/201; B60W 2556/45; B60W 2756/10; B60W 30/06; G05D 1/0297; H04W 4/46
See application file for complete search history.

(56) References Cited

U.S. PATENT DOCUMENTS

| | | | |
|---|---|---|---|
| 11,548,502 B2* | 1/2023 | Cho | .................. B62D 15/0285 |
| 2015/0039173 A1 | 2/2015 | Beaurepaire | |
| 2015/0070196 A1 | 3/2015 | Beaurepaire | |
| 2018/0364710 A1* | 12/2018 | Oppolzer | ............. G05D 1/0061 |

FOREIGN PATENT DOCUMENTS

| | | |
|---|---|---|
| DE | 102016214575 B4 | 2/2018 |
| DE | 102016216157 A1 | 3/2018 |
| DE | 102017112386 A1 | 12/2018 |
| DE | 102017120778 A1 | 3/2019 |
| DE | 102018217561 B3 | 12/2019 |
| DE | 102020200747 A1 | 7/2021 |
| WO | 14047695 A2 | 4/2014 |

* cited by examiner

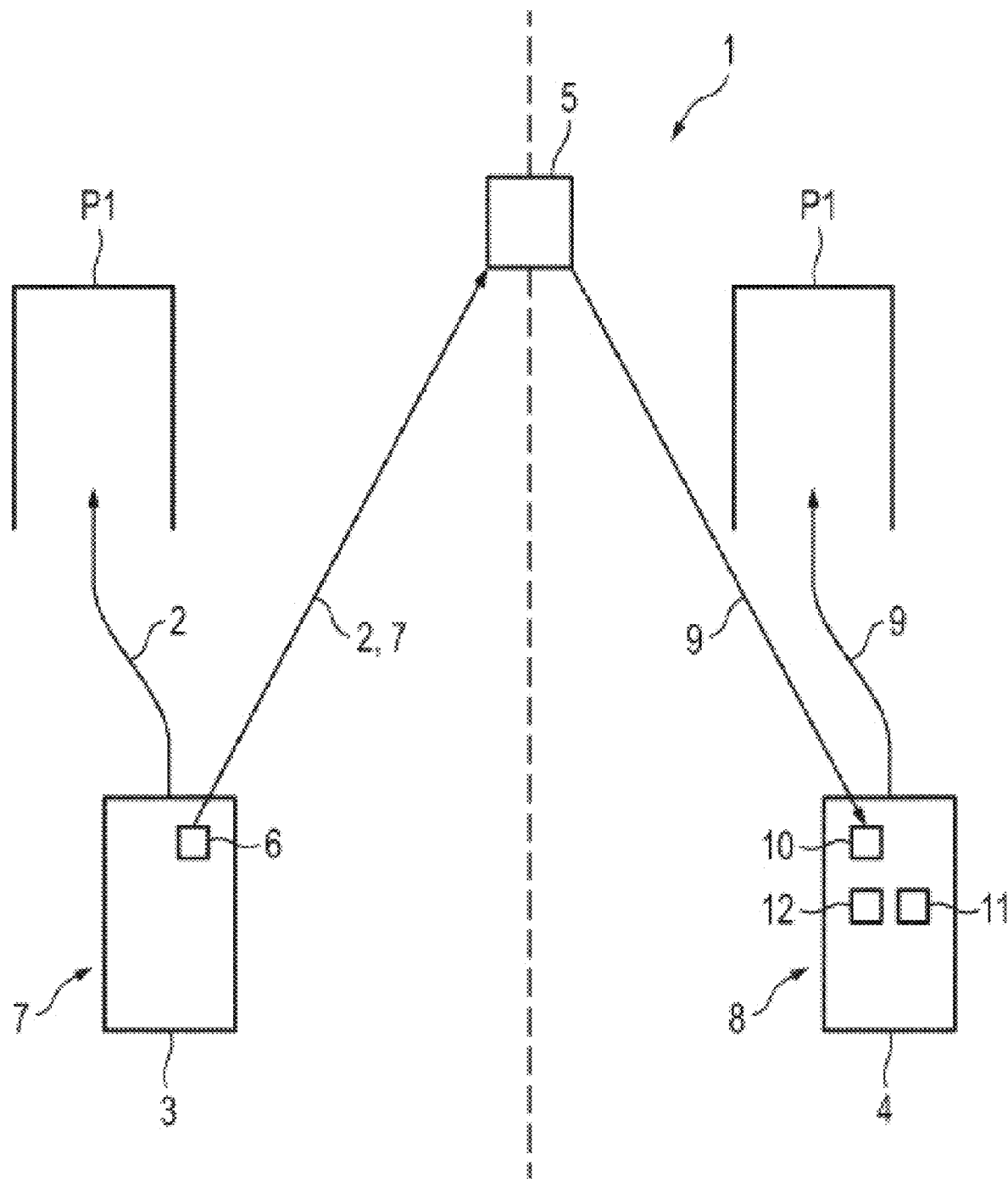

METHOD FOR PROVIDING AN ALREADY GENERATED TRAJECTORY OF A FIRST MOTOR VEHICLE FOR A SECOND MOTOR VEHICLE FOR FUTURE TRAVEL ALONG THE TRAJECTORY, COMPUTER PROGRAM PRODUCT AND ASSISTANCE SYSTEM

RELATED APPLICATIONS

The present application claims priority to International Patent Application No. PCT/EP2022/069390 to Gunzel et al., filed Jul. 12, 2022, titled "Method For Providing An Already Generated Trajectory Of A First Motor Vehicle For A Second Motor Vehicle For Future Travel Along The Trajectory, Computer Program Product And Assistance System," which claims priority to German Pat. App. No. DE 10 2021 208 407.9, filed Aug. 3, 2021, to Gunzel et al., the contents of each being incorporated by reference in their entirety herein.

TECHNICAL FIELD

The present disclosure relates to a technologies and techniques for providing an already generated trajectory of a first motor vehicle for a second motor vehicle for future travel along the trajectory via an assistance system, in which the trajectory is generated by the first motor vehicle and transmitted to an electronic computing device of the assistance system, which is located outside the motor vehicle, and in which at least one first parameter characterizing the motor vehicle is also transmitted to the electronic computing device located outside the motor vehicle. The present disclosure further relates to a computer program product and to an assistance system.

BACKGROUND

Parking assistance system that provide trained parking, for example, are already known from the prior art, which enable a driver to travel along a trajectory that was followed at an earlier point in time again, for example in a semi-automated manner. Semi-automated travel along a trajectory can, for example, be considered to be an intervention in a lateral guidance control device and/or a longitudinal guidance control device of the motor vehicle. For this purpose, the trajectory data, including the associated map data, is stored for localization along the trajectory, at the time at which the first travel along the trajectory started.

DE 10 2016 214 575 B4 relates to a method for driving a motor vehicle in an automated or semi-automated manner, wherein the motor vehicle comprises means for ascertaining a trajectory and storing the trajectory in a map, wherein the motor vehicle comprises means for self-localization in the map and then traveling along the trajectory in an automated or semi-automated manner, and wherein the motor vehicle comprises an interface by means of which a map and a trajectory are exported, as well as to a motor vehicle and to a server.

SUMMARY

Aspects of the present disclosure are directed to a method, a computer program, and an assistance system, by means of which a trajectory to be traveled in the future can be generated for a second motor vehicle in an improved manner.

Some aspects of the present disclosure are recited in the subject matter of the independent claims, found below. Further aspects are provided in the subject matter of the dependent claims.

In some examples, a method is disclosed for providing an already generated trajectory of a first motor vehicle for a second motor vehicle for future travel along the trajectory by means of an assistance system, in which the trajectory is generated by the first motor vehicle and transmitted to an electronic computing device of the assistance system, which is located outside the motor vehicle, and in which at least one first parameter characterizing the first motor vehicle, is also transmitted to the electronic computing device located outside the motor vehicle.

In some examples, an assistance system is disclosed for providing an already generated trajectory of a first motor vehicle for a second motor vehicle for future travel along the trajectory, comprising at least one electronic computing device located outside the motor vehicle, wherein the assistance system is designed to carry out methods according to the present disclosure. Described methods may be carried out by means of the assistance system.

Advantageous embodiments of the method shall be regarded as advantageous embodiments of the assistance system. For this purpose, the assistance system has present features which allow the method to be carried out. For example, the electronic computing device of the assistance system comprises electronic components, such as processors, circuits, for example integrated circuits, and further electronic components to be able to carry out corresponding method steps.

In some examples, refinements of the assistance system are disclosed, that may include features as those already described in connection with the refinements of the method according to the present disclosure. For this reason, the corresponding refinements of the assistance system according to the invention are not described again here for the purposes of brevity. Further aspects also encompass combinations of the features of the various embodiments.

DESCRIPTION OF THE DRAWINGS

FIG. 1 illustrates a schematic top and side view of an assistance system for providing an already generated trajectory of a first motor vehicle for a second motor vehicle for future travel along the trajectory, according to some aspects of the present disclosure.

DETAILED DESCRIPTION

The exemplary embodiment described hereafter is a preferred exemplary embodiment of the present disclosure. In the exemplary embodiment, the described components in each case represent individual features of the invention which are to be considered independently of one another and which each also refine the invention independently of one another and, as a result, shall also be considered to be an integral part of present disclosure, either individually or in a combination other than the one shown. Furthermore, the described exemplary embodiment may also be supplemented with additional features described herein.

In the FIGURE, functionally equivalent elements are each denoted by the same reference numerals.

In some examples, the already generated trajectory is evaluated, taking the first characterizing parameter into account, and that it is checked whether the trajectory is suitable for the second motor vehicle, wherein, if the already generated trajectory is not suitable for the second motor vehicle, the trajectory is adapted for the second motor vehicle, taking a second parameter characterizing the second motor vehicle into account.

It is thus checked (determined) whether the exported already traveled trajectory of the first motor vehicle is compatible with the second motor vehicle. For example, the transmitted data could potentially lead to a poor parking result, to the parking process not being able to be started, or to the parking process having to be aborted by the customer. If the already generated trajectory is not compatible with the second motor vehicle, it is checked whether it is possible for the corresponding data to be adapted as a function of the second characterizing parameter. This eliminates the need for the second motor vehicle to travel along the trajectory again, and the already generated trajectory can be utilized in an adapted manner so as to be followed by the second motor vehicle.

In some examples, the trajectory may be adapted via the electronic computing device located outside the motor vehicle. Alternately, or in addition, the trajectory may be adapted via an electronic computing device of the second motor vehicle located inside the motor vehicle. When the trajectory is being adapted by means of the electronic computing device located outside the motor vehicle, the second parameter characterizing the second motor vehicle is transmitted beforehand, from the second motor vehicle to the electronic computing device located outside the motor vehicle. The adaptation can then be carried out outside the motor vehicle, and computing capacity can thus be saved inside the motor vehicle. If the trajectory is to be adapted inside the motor vehicle, this has the advantage that this adaptation can be carried out directly, in real time, on the electronic computing device inside the motor vehicle.

Furthermore, it may be advantageous when a transmission and/or an output of the trajectory for the second motor vehicle is suppressed if a non-adaptable trajectory for the second motor vehicle. This has an advantage, in that non-adaptable trajectories are not transmitted, whereby the data volume of data to the transmitted is reduced. In particular, only compatible or adaptable trajectories are thus transmitted to the second motor vehicle.

In some examples, a turning circle of the motor vehicles and/or the width of the motor vehicles and/or a length of the motor vehicles and/or the wheelbase of the motor vehicles and/or a height of the motor vehicles and/or a motor vehicle type of the motor vehicles and/or a drive system type of the motor vehicles are taken into account as the first characterizing parameter and/or as the second characterizing parameter. It may also be possible to take loading conditions and/or tire pressures into account. As a result, the different specific characterizing parameters of the motor vehicles can be utilized. In this way, it can be specifically checked whether, for example, an adaptation of the already traveled trajectory is possible for the second motor vehicle. Moreover, the adapted trajectory can be generated in a specific and very detailed manner and be specifically followed by the second motor vehicle.

Furthermore, it may be advantageous when the already generated trajectory and/or the adapted trajectory are only transmitted to the second motor vehicle if the second motor vehicle does not have this trajectory. The second trajectory is thus not yet stored within the motor vehicle, in particular, the second motor vehicle. As a result, only trajectories that were not yet transmitted to the second motor vehicle are transmitted. In this way, it is possible for already transmitted trajectories not to be transmitted, whereby a data transmission rate can be reduced.

In some examples, the already generated trajectory and/or adapted trajectory are only transmitted to a second motor vehicle released by a user of at least the first motor vehicle. For example, the second motor vehicle may be a second motor vehicle of the user, and in particular a so-called secondary vehicle of the user. The trajectory is thus only transmitted to the user when he or she has released the second motor vehicle. In this way, it is possible to generate person-specific trajectories which are not transmitted to other motor vehicles. As a result, data protection can be ensured. In particular in the case of car sharing, in the case of a secondary vehicle or when changing vehicles, for example, this has the advantage that the corresponding personalized trajectories can be utilized. This eliminates a complex training process of trajectories that were already generated by another vehicle.

It may further be advantageous when, during the generation of the trajectory, a surroundings detection type and/or a relative positioning of the first motor vehicle and/or a localization type and/or a localization quality and/or a vehicle configuration data set and/or a data type for the generated trajectory are taken into account. In this way, the second trajectory can be adapted in a detailed manner. In the event that, for example, the two motor vehicles are equipped differently, for example comprise different detection devices or different evaluation devices, in particular a corresponding adaptation of the trajectory can again be implemented, based on this information.

In some examples, the already generated trajectory and/or the adapted trajectory are output to a user of the second motor vehicle for selection on an output device of the second motor vehicle. Only trajectories that have not yet been transmitted are output on the output device. The user can then check whether the use of the trajectory is to be continued. The user can furthermore check whether the trajectory which was adapted is in fact suitable for the motor vehicle. In this way, a verification of the adapted trajectory within the motor vehicle can be implemented.

The methods disclosed herein may be implemented as a computer-implemented method. Another aspect of the present disclosure thus relates to a computer program product comprising program code means, which prompt an electronic computing device to carry out a method according to the preceding aspect when the program code means are being processed by the electronic computing device. Another aspect of the invention thus also relates to a computer-readable memory medium comprising a computer program product.

FIG. 1 shows a schematic top view onto one embodiment of an assistance system 1, under some aspects of the present disclosure. The assistance system 1 may be configured to provide an already generated trajectory 2 of a first motor vehicle 3 for a second motor vehicle 4 for future travel along the trajectory 2. For this purpose, the assistance system 1 comprises an electronic computing device 5 located outside the motor vehicle.

In the method for providing an already generated trajectory 2 of the first motor vehicle 3 for the second motor vehicle 4 for future travel along the trajectory 2, the trajectory 2 may be generated by the first motor vehicle 3 and transmitted to the electronic computing device 5 located outside the motor vehicle, for example from a first communication device 6 of the first motor vehicle 3. Furthermore, a first parameter 7 characterizing the first motor vehicle 3 is also transmitted to the electronic computing device 5 located outside the motor vehicle.

It is provided in the process that the already generated trajectory 2 is evaluated, taking the first characterizing parameter 7 into account, and that it is checked whether the trajectory 2 is suitable for the second motor vehicle 4, wherein, if the already generated trajectory 2 is not suitable for the second motor vehicle 4, the trajectory is adapted for the second motor vehicle 4, taking a second parameter 8 characterizing the second motor vehicle 4 into account. In particular, the second motor vehicle 4 thus travels along an adapted trajectory 9.

In the present example, it is shown that the trajectory 2 and the adapted trajectory 9 lead to a parking lot P1. In this example, trajectory 2 and the adapted trajectory 9 differ from one another.

It may be provided that the trajectory 2 is adapted by means of the electronic computing device 5 located outside the first motor vehicle 3 and, for example, the adapted trajectory 9 can then be transmitted to a second communication device 10 of the second motor vehicle 4. As an alternative, the adaptation of the trajectory 2 may also be implemented by means of an electronic computing device 11 of the second motor vehicle 4 which is located outside the first motor vehicle 3. FIG. 1 illustrates that the trajectory 2 is already being adapted by means of the electronic computing device 5 outside the motor vehicle, and that the adapted trajectory 9 is being transmitted to the second motor vehicle 4.

In the event that the trajectory 2 is not adaptable for the second motor vehicle 4, a transmission and/or an output of the trajectory 2 for the second motor vehicle 4 is suppressed. Furthermore, the already generated trajectory 2 and/or the adapted trajectory 9 are only transmitted to the second motor vehicle 4 if the second motor vehicle 4 does not yet have this trajectory, and in particular does not yet have it stored in a corresponding memory device.

In particular, a turning circle of the motor vehicles 3, 4 and/or a width of the motor vehicles 3, 4 and/or a length of the motor vehicles 3, 4 and/or a wheelbase of the motor vehicles 3, 4 and/or a height of the motor vehicles 3, 4 and/or a motor vehicle type of the motor vehicles 3, 4 and/or a drive system type of the motor vehicles 3, 4 can be taken into account as the first characterizing parameter 7 and/or as the second characterizing parameter 8. Furthermore, it may also be provided that a surroundings detection type and/or a relative positioning of the first motor vehicle 3 and/or a localization type and/or a localization quality and/or a vehicle configuration data set and/or a data type for the generated trajectory 2 are taken into account in the generated trajectory 2.

Furthermore, it is in particular provided that the already generated trajectory 2 and/or the adapted trajectory 9 are only transmitted to a second motor vehicle 4 released by a user of at least the first motor vehicle 3. For example, the second motor vehicle 4 may be a secondary vehicle of the user. In particular, the parking lot P1 can, for example, be a parking lot at a workplace of the user or a parking lot at the user's home, where trained parking by way of the first motor vehicle 3 and the second motor vehicle 4 is desirable. Furthermore, it may be provided that the already generated trajectory 2 and/or the adapted trajectory 9 are output to a user of the second motor vehicle 4 for selection on an output device 12 of the second motor vehicle 4.

In some examples, the FIGURE describes that, in a first step, the generation and storage of the map data and trajectory data of the trajectory 2 are carried out in the first motor vehicle 3, wherein the first motor vehicle 3 can comprise different surroundings sensors. It is necessary in the process that an associated compatibility data set is generated, which serves as the basis for the compatibility check. The reason is that differences between the recording vehicle, this being the first motor vehicle 3, and the receiving vehicle, this being the second motor vehicle 4, may cause the transmitted data to be unusable in the second motor vehicle 4.

During the generation of the compatibility data set, the first motor vehicle 3 takes the following information into account. In particular, a position and an orientation of the surroundings sensor may be taken into account. Furthermore, a detection capability of the surroundings sensor, for example an aperture angle, a frame rate and/or a resolution may be taken into account. A transmission of the quality of the localization features, for example the feature density, of the recorded map data may be taken into account. A vehicle configuration data set of the first motor vehicle 3 with relevance for the surroundings detection, for example the type of the lighting system, may be taken into account. Furthermore, the data format and the map data and the trajectory data may be taken into account.

For example, the position and the orientation of the surroundings sensor of the first motor vehicle 3 and of the second motor vehicle 4 deviate from one another since different vehicle models are involved. This can cause problems with the use of the data. Accordingly, a transformation of the data corresponding to the installation position may be required.

In a further example, the detection capabilities of the surroundings sensors of the first motor vehicle 3 and of the second motor vehicle 4 may deviate. As a result, localization features may not be locatable due to the changed surroundings sensor. Depending on the quality of the localization features, for example the feature density, of the recorded map data, it is possible to dispense with some of the localization features. If, however, an excessive amount of localization data is not usable due to the different surroundings sensors, for example larger aperture angle in the recording vehicle than in the receiving vehicle, and the remaining feature density is too low, the trajectory cannot be utilized in the receiving vehicle using the data, and an adaptation is not possible. A check is then carried out as to whether sufficient features are present, and a renewed recording by way of the second motor vehicle 4 may be necessary.

Another example may be that the vehicle configuration with relevance for the surroundings detection, for example the type of the lighting system, deviates. As a result, it may not be possible to locate localization features due to the changed lighting conditions in the case of poor lighting, for example in an underground parking garage and in the dark. Depending on the quality of the localization features, the feature density for example, of the recorded map data, it is possible to dispense with some of the localization features. If, however, an excessive amount of localization data is not usable and the remaining feature density is too low, the trajectory 2 cannot be utilized in the second motor vehicle 4 using the data, and an adaptation is not possible. This may prompt a check as to whether or not sufficient features are present. A renewed recording by way of the second motor vehicle 4 may be necessary.

Furthermore, a data format may also not be identical, for example the same information is stored differently due to different sensor generations. A conversion or adaptation may be necessary here.

In a further step, the data can be stored in an accordingly personalized manner. A personalization data set of the user is used in the first motor vehicle 3 for this purpose.

In a further step, the data is personalized with the aid of the personalization data set of the user and stored in the electronic computing device 5 located outside the motor vehicle. A storing in the electronic computing device 5 located outside the motor vehicle, which can also be referred to as back-end, for the provision or the transmission to the second motor vehicle 4 of the same user is only possible when the data includes an associated compatibility data set, since otherwise a compatibility check is not possible prior to a transmission.

In a further step, the compatibility check is carried out. The stored data in the electronic computing device 5 outside the motor vehicle is accessed from the first motor vehicle 3 via the personalization data set. Thereafter, the plurality of stored map data and trajectory data of the first motor vehicle 3 are checked for compatibility. For this purpose, the data from the compatibility data set of the recording vehicle is compared to the data of the second motor vehicle 4. In the process, data which can be used in the second motor vehicle 4 without adaptation, which can be used in the second motor vehicle 4 after adaptation, and which cannot be used in the second motor vehicle 4 are identified.

This is followed by the check for new data or a display of the selection. It is furthermore checked which of the usable data is not yet present on the second motor vehicle 4. This data is displayed to the user in the second motor vehicle 4 for selection. This has the advantage that no data which is not usable and which is already present or has already been transmitted is displayed to the driver for selection. If no new compatible data is present, this is displayed to the driver or user. During the display, it is possible for a certain categorization or prioritization to be carried out as a function of the up-to-dateness or the frequency of the prior use.

Then, the transmission to the second motor vehicle 4 is carried out. Thereafter, the user selects the data to be transmitted to the second motor vehicle 4. Furthermore, the adaptation of the map data and trajectory data can then be implemented. If the selected data is compatible without adaptation, this data can be transmitted directly. If the selected data has to and can be adapted, the map data and trajectory data are adapted based on the compatibility data set of the first motor vehicle 3, of the second motor vehicle 4, and of the result of the compatibility check.

If, for example, different positions of the surroundings sensors of the first motor vehicle 3 and of the second motor vehicle 4 are observed, the adaptation or a conversion of the map data and trajectory data can encompass a transformation of the data corresponding to the installation position.

In a further step, the check is then carried out with the aid of the transmitted data after the new/adapted trajectory 9 has been traveled for the first time. During the initial travel along the trajectory 9, it is checked whether travel with the aid of the transmitted data was possible or whether the travel is aborted. If the travel along the trajectory was successful, and in particular the target position of the trajectory 9, in the present example this being the parking lot P1, for example, was reached, the data is transmitted again with a new compatibility data set to the electronic computing device 5 located outside the motor vehicle so as to be available for further motor vehicle. If the travel along the trajectory was not successful, for example was aborted by the driver or the target position was not reached, the user is asked about his or her satisfaction and/or is offered to delete the transmitted data.

Furthermore, it may be provided that the transmission is only carried out between motor vehicles 3, 4 of the same user. For example, the transmission can be implemented between the primary and secondary cars or between the primary car and a rental car or between an existing and a new leased car. Furthermore, alternatively it is also possible to implement the adaptation both inside the motor vehicle and in the electronic computing device 5 outside the motor vehicle.

LIST OF REFERENCE SIGNS

1 assistance system
2 generated trajectory
3 first motor vehicle
4 second motor vehicle
5 electronic computing device located outside the motor vehicle
6 first communication device
7 first parameter characterizing the first motor vehicle
8 second parameter characterizing the second motor vehicle
9 adapted trajectory
10 second communication device
11 electronic computing device located inside the motor vehicle
12 output device
P1 parking lot

The invention claimed is:

1. A method for providing an already generated trajectory of a first motor vehicle for at least one second motor vehicle for future travel along the trajectory via an assistance system, comprising:
   receiving, at an electronic computing device of the assistance system, the already generated trajectory generated by the first motor vehicle;
   receiving, at the electronic computing device, surroundings sensor data representative of an environment of the first motor vehicle and at least one first parameter characterizing the first motor vehicle;
   evaluating, at the electronic computing device, the already generated trajectory using the surroundings sensor data and the at least one first parameter to determine whether the trajectory is suitable for the second motor vehicle;
   adapting, at the electronic computing device, the trajectory for the second motor vehicle using at least one second parameter characterizing the second motor vehicle when the evaluating determines that the trajectory is not suitable for the second motor vehicle; and
   transmitting, from the electronic computing device, the adapted trajectory to the second motor vehicle for guiding the second motor vehicle along the adapted trajectory.

2. The method of claim 1, wherein adapting the trajectory comprises performing the adaptation at the electronic computing device of the assistance system configured outside the first motor vehicle.

3. The method of claim 1, wherein adapting the trajectory comprises performing the adaptation at an electronic computing device of the second motor vehicle configured inside the second motor vehicle.

4. The method of claim 1, further comprising suppressing transmission of the trajectory to the second motor vehicle when the adaptation indicates that the trajectory is not adaptable for the second motor vehicle.

5. The method of claim 1, wherein the at least one first parameter or the at least one second parameter comprises at least one of: a turning circle, a width, a length, a wheelbase, a height, a vehicle type, or a drive system type.

6. The method of claim 1, wherein transmitting the trajectory to the second motor vehicle occurs when the second motor vehicle does not include, in stored trajectory data, the same trajectory as the already generated trajectory.

7. The method of claim 1, wherein the adapted trajectory is transmitted to the second motor vehicle when the second motor vehicle does not include, in stored trajectory data, the same trajectory as the adapted trajectory.

8. The method of claim 1, wherein transmitting the trajectory to the second motor vehicle occurs only when the transmission is authorized by a user of at least the first motor vehicle.

9. The method of claim 1, wherein generating the already generated trajectory by the first motor vehicle comprises processing at least one of: a surroundings detection type, a relative positioning of the first motor vehicle, a localization type, a localization quality, a vehicle configuration data set, or a data type for the trajectory.

10. The method of claim 1, further comprising outputting the trajectory or the adapted trajectory to the second motor vehicle for presentation on an output device of the second motor vehicle.

11. An assistance system for providing an already generated trajectory of a first motor vehicle for at least one second motor vehicle for future travel along the trajectory, comprising:
a memory; and
at least one electronic computing device configured to:
receive the already generated trajectory generated by the first motor vehicle;
receive surroundings sensor data representative of an environment of the first motor vehicle and at least one first parameter characterizing the first motor vehicle;
evaluate the already generated trajectory using the surroundings sensor data and the at least one first parameter to determine whether the trajectory is suitable for the second motor vehicle;
adapt the trajectory for the second motor vehicle using at least one second parameter characterizing the second motor vehicle when the evaluation determines that the trajectory is not suitable for the second motor vehicle; and
transmit the adapted trajectory to the second motor vehicle for guiding the second motor vehicle along the adapted trajectory.

12. The assistance system of claim 11, wherein the at least one electronic computing device is configured to perform the adaptation at the assistance system outside the first motor vehicle.

13. The assistance system of claim 11, wherein the at least one electronic computing device is configured to perform the adaptation at an electronic computing device of the second motor vehicle inside the second motor vehicle.

14. The assistance system of claim 11, wherein the at least one electronic computing device is configured to suppress transmission of the trajectory to the second motor vehicle when the adaptation indicates that the trajectory is not adaptable for the second motor vehicle.

15. The assistance system of claim 11, wherein the at least one first parameter or the at least one second parameter comprises at least one of: a turning circle, a width, a length, a wheelbase, a height, a vehicle type, or a drive system type.

16. The assistance system of claim 11, wherein the at least one electronic computing device is configured to transmit the trajectory to the second motor vehicle when the second motor vehicle does not include, in stored trajectory data, the same trajectory as the already generated trajectory.

17. The assistance system of claim 11, wherein the at least one electronic computing device is configured to transmit the adapted trajectory to the second motor vehicle when the second motor vehicle does not include, in stored trajectory data, the same trajectory as the adapted trajectory.

18. The assistance system of claim 11, wherein the at least one electronic computing device is configured to transmit the trajectory to the second motor vehicle only when the transmission is authorized by a user of at least the first motor vehicle.

19. The assistance system of claim 11, wherein the at least one electronic computing device is configured to generate the already generated trajectory by processing at least one of: a surroundings detection type, a relative positioning of the first motor vehicle, a localization type, a localization quality, a vehicle configuration data set, or a data type for the trajectory.

20. A non-transitory computer-readable medium having stored therein instructions executable by one or more processors for supporting operation of a vehicle with a sensor unit for acquiring sensor data, the instructions when executed causing the processors to:
receive, at an electronic computing device of an assistance system, the already generated trajectory generated by a first motor vehicle;
receive, at the electronic computing device, surroundings sensor data representative of an environment of the first motor vehicle and at least one first parameter characterizing the first motor vehicle;
evaluate, at the electronic computing device, the already generated trajectory using the surroundings sensor data and the at least one first parameter to determine whether the trajectory is suitable for at least one second motor vehicle;
adapt, at the electronic computing device, the trajectory for the second motor vehicle using at least one second parameter characterizing the second motor vehicle when the evaluation determines that the trajectory is not suitable for the second motor vehicle; and
transmit the adapted trajectory to the second motor vehicle for guiding the second motor vehicle along the adapted trajectory.

* * * * *